July 1, 1969  R. J. RICCIARDI  3,452,904
MATERIAL HANDLING EQUIPMENT
Filed Sept. 19, 1967
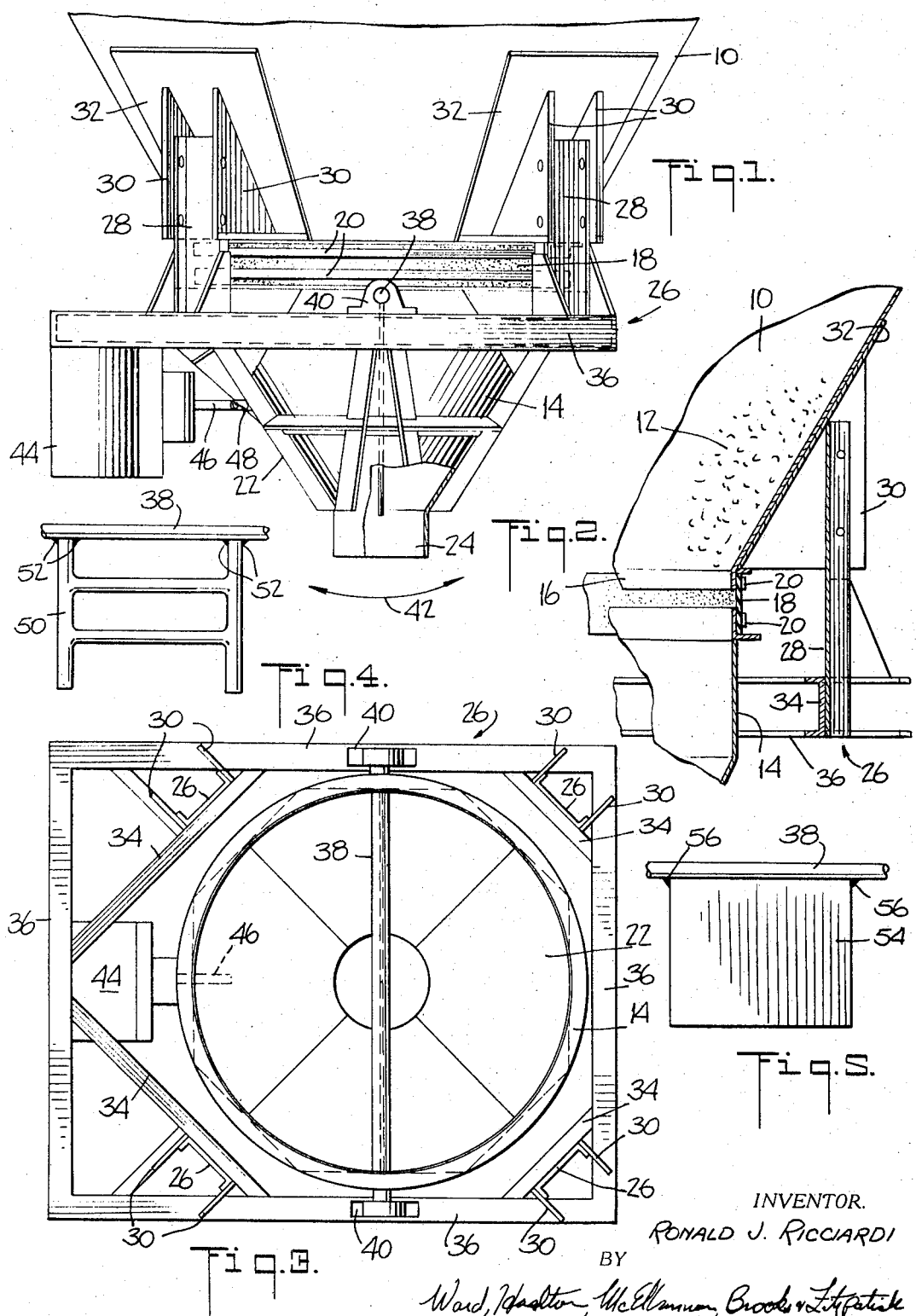
INVENTOR.
RONALD J. RICCIARDI
BY
Ward, Haselton, McElhannon, Brooks & Fitzpatrick
ATTORNEYS

United States Patent Office 3,452,904
Patented July 1, 1969

3,452,904
MATERIAL HANDLING EQUIPMENT
Ronald J. Ricciardi, Garfield, N.J.
(121 Dayton Ave., Passaic, N.J. 07055)
Continuation-in-part of application Ser. No. 504,429,
Oct. 24, 1965. This application Sept. 19, 1967, Ser.
No. 668,812
The portion of the term of the patent subsequent to
Nov. 21, 1984, has been disclaimed
Int. Cl. B65g 3/12, 65/70
U.S. Cl. 222—200         11 Claims

ABSTRACT OF THE DISCLOSURE

Apparatus for conditioning and dispensing particulated solid material from a large stationary storage bin including a frame fixedly connected to the storage bin and carrying a transverse shaft upon which a hopper bottom is mounted adjacent the outlet of the storage bin. Also, an agitator is mounted on the transverse shaft, and means are provided to impart arcuate reciprocating motion to the hopper bottom.

---

This application is a continuation-in-part application Ser. No. 504,429 filed Oct. 24, 1965, now Patent 3,353,720, for "Material Handling Equipment."

This invention pertains to material handling equipment and more particularly to means for delivering dry comminuted or aggregate material from a supply bin or hopper.

A device constructed in accordance with the concept of this invention is useful for the promotion of flow of dry particulate materials from stationary storage bins, hoppers, silos or the like. This device is particularly useful when the storage container is of relatively large size. Heretofore, various devices and methods have been employed to promote the flow of material from containers; such devices include vibrators attached to the walls of the bin, air jets or pads to inject air into the material within the bin, and gyration or vibration of the entire bin, for example. However, these devices have not been entirely satisfactory for one reason or another. Movement of a very large bin or silo is impractical and injection apparatus is prone to be cumbersome and complicated. Vibration techniques are effective in some cases, but they are limited by their inability to promote flow of all materials and from certain areas of the bing. Further, apparatus employing vibration tends to be limited by a shortened life expectancy.

In order to overcome the aforementioned limitations and problems, the present invention provides new and improved apparatus for dispensing material from a container which briefly stated comprises a frame which is mountable on the bottom adjacent the outlet of a large fixedly mounted storage bin. The frame has downwardly extending members for the mounting thereon of a transversely disposed shaft. A hopper bottom is mounted on the shaft, and an agitator is also mounted on this shaft. Further, means are provided for imparting arcuate reciprocating motion to the hopper bottom.

In one form of the invention, the hopper bottom is mounted adjacent the upper edge thereof on said shaft, and the agitator is fixedly secured to the shaft and extends downwardly therefrom for gentle oscillation thereabout simultaneously with movement of the hopper bottom. In this manner the material is gently agitated and caused to flow towards the dispensing outlet of the hopper bottom.

Further, according to one aspect of my invention, the means for imparting reciprocating motion is connected to the hopper bottom. Both the amplitude and frequency are easily adjusted to suit the characteristics of the material being handled. It will also be appreciated that according to my invention, material lying directly above the hopper bottom is induced to flow by the force of movement directed vertically from the pivoting action of the unit. This movement is transmitted to various depths in the material depending upon the characteristics of that material and the degree of movement imparted to it.

A feature of my invention resides in the provision of new and improved apparatus for conditioning and dispensing particulate solid material which is relatively simple and inexpensive to manufacture and which is highly efficient in operation.

Another feature of the invention is the provision of a new and improved apparatus which promotes flow of many different kinds and sizes of material from a storage container, which promotes flow of material from all areas of the container, and which readily promotes flow of material from large or small storage containers.

Yet another feature of my invention resides in the provision of a new and improved apparatus for dispensing particulate material which is rugged in construction and which is durable in use.

Other objects, advantages and features reside in the details of construction and operation, as more fully hereinafter described and claimed, reference being had to the accompanying drawings forming part hereof, wherein like numerals refer to like parts throughout, and in which:

FIG. 1 is a side elevation, partially broken away, showing a storage bin and hopper bottom constructed in accordance with my invention;

FIG. 2 is a fragmentary vertical sectional view showing details of the interconnection between the upper storage bin and the hopper bottom;

FIG. 3 is a plan view of the hopper bottom, transverse shaft, and means for arcuately reciprocating the hopper bottom;

FIG. 4 is a side elevation of one form of agitator; and

FIG. 5 is a side elevation of another form of agitator according to my invention.

In the illustrated embodiment of my invention, the apparatus for feeding and conditioning particulate solid material includes a large stationary storage bin 10 for containing a supply of particulate material 12. A hopper bottom 14 is disposed under the outlet 16 of the stationary bin 10 in material receiving attitude as shown in the drawings. A flexible sleeve 18 held in position by clamps 20 interconnects the stationary bin 10 and the hopper bottom 14. The flexible sleeve 18 serves to prevent the loss of material during its passage from the stationary bin to the hopper bottom as well as preventing the escape of dust into the surrounding atmosphere, but nevertheless allowing for movement of the members one with respect to the other.

The hopper bottom 14 has side walls 22 which are downwardly, inwardly extending, terminating in a lower dispensing outlet 24. The slope of the side walls with respect to the horizontal is from about 5 degrees to about 45 degrees depending upon the particular material being handled.

In the illustrated embodiment of my invention, for purposes of supporting the hopper bottom 14, a hopper bottom frame indicated generally at 26, is provided. The frame 26 has two pair of oppositely disposed upright members 28 which are each fixedly connected to angle brackets 30 at their upper ends. The angle brackets are fixedly connected to plates 32 which are in turn fixedly connected to the storage bin 10. The lower ends of the upright members 28 are fixedly connected to corner supports 34 which are fixedly connected to two pair of main horizontal members 36. The horizontal members form a rectangularly shaped structure upon which transverse shaft 38 is mounted for pivotal movement in support bearings 40 provided for the purpose, thereby forming a swing or cradle-like structure for rocking the hopper bottom 14.

As best seen in FIGS. 1 and 3, in order to impart arcuate reciprocating motion to the hopper bottom 14, as shown by arrow 42, an electric motor 44 reciprocally drives connecting rod 46 which is pivotally connected to the hopper bottom 14 as at 48. According to the concept of this invention, the hopper bottom 14 is gently, reciprocally, pivotally rocked back and forth causing the material to flow downwardly from the stationary bin, through the hopper bottom and out the discharge outlet 24. Motion of the hopper bottom promotes flow of the material where the material converges towards the dispensing outlet without packing or plugging. Thus, motion is imparted to the material at precisely the critical point where it is most required. The aforementioned motion of the hopper bottom causes a gradually increasing movement of the material as it progresses downwardly thereby insuring a nonsegregated, non-degrated, non-aerated and non-compacted continuous supply of material through the dispensing outlet.

Additional gentle agitation in the hopper bottom 14 is effected by means of internal agitators. In one form of my invention, as seen in FIG. 4, an agitator 50 is fixedly connected to the transverse shaft 38 as at 52. This agitator has a ladder-like configuration and is particularly effective with certain types of material being processed. In another form of my invention, as seen in FIG. 5, an agitator 54 is fixedly connected to the transverse shaft 38 as at 56. This agitator has a plate-like configuration and is particularly useful with other types particulate solid material. It will be appreciated that as the pivot shaft 38 oscillates due to movement of the hopper bottom 14, it causes the agitators to move in a like manner. This additional agitation is particularly desirable when handling certain difficult materials.

In view of the foregoing description, taken in conjunction with the accompanying drawings, it is believed that a clear understanding of the construction, operation and advantages of the device will be quite apparent to those skilled in the art. A more detailed description is accordingly deemed unnecessary.

It is to be understood, however, that even though I have herein shown and described several preferred embodiments of my invention, the same are susceptible to certain changes fully comprehended by the spirit of the invention as herein described and the scope of the appended claims.

Having thus described the invention, what I claim is:

1. Apparatus for conditioning and dispensing particulated solid material comprising an upper storage bin having a lower outlet, a frame having a pair of upright members fixedly connected to said upper storage bin, a transverse shaft mounted on said frame adjacent said outlet, a hopper bottom mounted on said shaft, adjacent said outlet, said hopper bottom having an upper inlet, an agitator mounted on said shaft and means for imparting arcuate reciprocating motion to said hopper bottom.

2. Apparatus for conditioning and dispensing particulated solid material according to claim 1 wherein the lower outlet of said upper storage bin is substantially the same size as the upper inlet of said hopper bottom.

3. Apparatus for conditioning and dispensing particulated solid material comprising a fixedly mounted frame mounted adjacent the bottom outlet of a large stationary storage bin, a transverse shaft mounted on said frame below said outlet, a hopper bottom having an upper inlet mounted on said shaft in material receiving attitude with respect to said storage bin, an agitator mounted on said shaft, and means for imparting arcuate reciprocating motion to said hopper bottom.

4. Apparatus for conditioning and dispensing particulated solid material according to claim 3 wherein the upper edge of said hopper bottom is fixedly connected to said transverse shaft.

5. Apparatus for conditioning and dispensing particulated solid material according to claim 3 wherein said agitator extends downwardly from said shaft within said hopper bottom.

6. Apparatus for conditioning and dispensing particulated solid material according to claim 3 wherein said means for imparting arcuate reciprocating motion is pivotally connected to said hopper bottom.

7. Apparatus for conditioning and dispensing particulated solid material according to claim 3 wherein said transverse shaft, agitator and hopper bottom are moved simultaneously as a unit.

8. Apparatus for conditioning and dispensing particulated solid material according to claim 3 wherein said agitator is in the form of a plate.

9. Apparatus for conditioning and dispensing particulated solid material according to claim 3 wherein said agitator has a ladder-like configuration.

10. Apparatus for conditioning and dispensing particulated solid material comprising a fixedly mounted frame mountable on the bottom adjacent the outlet of a large stationary storage bin, a transverse shaft mounted on said frame below said outlet, a hopper bottom having an upper edge, said upper edge being mounted on said transverse shaft, an agitator mounted on said shaft, said agitator extending downwardly from said shaft within said hopper bottom, and means connected to said hopper bottom for imparting arcuate reciprocating motion simultaneously to said hopper bottom and said agitator.

11. Apparatus for conditioning and dispensing particulated solid material comprising a frame mounted adjacent the bottom outlet of a large stationary storage bin, a transverse shaft mounted on said frame, a hopper bottom having an upper inlet mounted on said shaft in material receiving attitude with respect to said storage bin, an agitator mounted on said shaft, and means for imparting arcuate reciprocating motion to said hopper bottom, said frame having two pairs of oppositely disposed upright members, a pair of angle brackets fixedly connected to each of said upright members at the upper ends thereof respectively, a plate fixedly connected to each pair of angle brackets, each of said plates being fixedly connected to said storage bin, corner supports fixedly connected to the lower ends of said upright members, main horizontal members forming a substantially rectangularly shaped structure, said corner supports being fixedly connected to said horizontal members, a pair of spaced support bearings mounted on said horizontal members, and said transverse shaft being mounted on said bearings.

References Cited

UNITED STATES PATENTS

| | | | |
|---|---|---|---|
| 1,783,423 | 12/1930 | Harper | 222—161 |
| 2,192,256 | 3/1940 | Brandt | 222—245 |
| 2,729,362 | 1/1956 | Hughes | 222—161 |
| 3,353,720 | 11/1967 | Ricciardi | 222—200 |
| 2,740,552 | 4/1956 | Palmer | 221—178 |

FOREIGN PATENTS

| | | |
|---|---|---|
| 143,425 | 5/1920 | Great Britain. |

ROBERT B. REEVES, *Primary Examiner.*